(12) United States Patent
Mori et al.

(10) Patent No.: US 10,493,813 B2
(45) Date of Patent: Dec. 3, 2019

(54) STRUCTURE OF ROCKING CONTROLLER OF SADDLE RIDING TYPE VEHICLE

(71) Applicant: HONDA MOTOR CO., LTD., Minato-ku, Tokyo (JP)

(72) Inventors: Yotaro Mori, Wako (JP); Hiroyuki Kaneta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 137 days.

(21) Appl. No.: 15/906,050

(22) Filed: Feb. 27, 2018

(65) Prior Publication Data

US 2018/0281546 A1 Oct. 4, 2018

(30) Foreign Application Priority Data

Mar. 29, 2017 (JP) ................................. 2017-066056

(51) Int. Cl.
*B60G 17/015* (2006.01)
*B60G 21/00* (2006.01)
*B60G 21/05* (2006.01)

(52) U.S. Cl.
CPC ....... *B60G 17/0157* (2013.01); *B60G 21/007* (2013.01); *B60G 21/05* (2013.01);
(Continued)

(58) Field of Classification Search
CPC .. B60G 17/0157; B60G 21/007; B60G 21/05; B60G 2202/42; B60G 2202/442;
(Continued)

(56) References Cited

U.S. PATENT DOCUMENTS 2,819,093 A * 1/1958 Geiser .................... B60G 21/00
  280/282
4,632,413 A * 12/1986 Fujita ....................... B60G 3/01
  280/124.103
(Continued)

FOREIGN PATENT DOCUMENTS

EP 3056418 8/2016
JP 2013-534488 9/2013
(Continued)

OTHER PUBLICATIONS

Japanese Office Action for Japanese Patent Application No. 2017-066056 dated Oct. 23, 2018.
(Continued)

*Primary Examiner* — Drew J Brown
(74) *Attorney, Agent, or Firm* — Amin, Turocy & Watson LLP

(57) ABSTRACT

A structure of rocking controller of a saddle riding type vehicle includes a rocking lock mechanism configured to lock lateral rocking of the vehicle body; wherein the rocking lock mechanism includes an arc shaped lock plate which crosses with an axial direction of a rocking shaft of the vehicle body and a lock caliper configured to lock a relative rocking between the lock plate and the lock caliper by clamping the lock plate, and a motor for the actuator is arranged in front of the rocking lock mechanism and the rotating drive shaft of the motor is arranged so as to penetrate an inner circumferential region of the arc shaped lock plate.

4 Claims, 9 Drawing Sheets

(52) U.S. Cl.
CPC .... *B60G 2202/42* (2013.01); *B60G 2202/442* (2013.01); *B60G 2204/4604* (2013.01); *B60G 2204/82* (2013.01); *B60G 2204/8302* (2013.01); *B60G 2300/122* (2013.01); *B60G 2300/45* (2013.01); *B60G 2800/012* (2013.01)

(58) Field of Classification Search
CPC ........ B60G 2204/4604; B60G 2204/82; B60G 2204/8302; B60G 2300/122; B60G 2300/45; B60G 2800/012; B62K 5/027; B62K 5/05; B62K 5/08; B62K 5/10
See application file for complete search history.

(56) References Cited

U.S. PATENT DOCUMENTS

| | | | | |
|---|---|---|---|---|
| 4,647,053 | A * | 3/1987 | Kanno | B62D 37/00 |
| | | | | 280/6.154 |
| 8,419,027 | B2 * | 4/2013 | Ting | B62K 5/02 |
| | | | | 280/124.103 |
| 8,596,660 | B2 * | 12/2013 | Hsu | B62K 5/10 |
| | | | | 180/210 |
| 9,994,277 | B2 * | 6/2018 | Malphettes | B60G 3/20 |
| 2008/0238005 | A1 * | 10/2008 | James | B62D 9/02 |
| | | | | 280/5.509 |
| 2010/0044977 | A1 * | 2/2010 | Hughes | B60G 21/007 |
| | | | | 280/5.509 |
| 2013/0161919 | A1 | 6/2013 | Gaillard-Groleas et al. | |
| 2014/0375015 | A1 | 12/2014 | Yu | |
| 2018/0086168 | A1 * | 3/2018 | Iguchi | B60G 17/0162 |
| 2018/0086169 | A1 * | 3/2018 | Iguchi | B60G 17/0162 |
| 2018/0264906 | A1 * | 9/2018 | Hara | B60G 17/0162 |
| 2018/0265157 | A1 * | 9/2018 | Hara | B62K 25/08 |
| 2018/0265158 | A1 * | 9/2018 | Hara | B62K 5/08 |
| 2018/0281543 | A1 * | 10/2018 | Mori | B62K 5/003 |
| 2018/0281890 | A1 * | 10/2018 | Mori | B60G 3/20 |
| 2019/0144035 | A1 * | 5/2019 | Doerksen | B62D 9/02 |
| | | | | 280/124.103 |

FOREIGN PATENT DOCUMENTS

| | | | |
|---|---|---|---|
| JP | 2015127183 A | * | 7/2015 |
| JP | 2016-147537 | | 8/2016 |
| JP | 2016-147539 | | 8/2016 |
| JP | 2017-056907 | | 2/2017 |

OTHER PUBLICATIONS

Extended European Search Report for European Patent Application No. 18158884.9 dated Aug. 9, 2018.

* cited by examiner

STRUCTURE OF ROCKING CONTROLLER OF SADDLE RIDING TYPE VEHICLE

CROSS-REFERENCE TO RELATED APPLICATION

Priority is claimed on Japanese Patent Application No. 2017-066056, filed Mar. 29, 2017, the content of which is incorporated herein by reference.

BACKGROUND OF THE INVENTION

Field of the Invention

The present invention relates to a structure of rocking controller of a saddle riding type vehicle.

Description of Related Art

In the related art, a structure of rocking controller of a saddle riding type vehicle including a pair of left and right front wheels and an actuator configured to control the lateral rocking of the vehicle body is known (for example, see Japanese Unexamined Patent Application, First Publication No. 2016-147539).

SUMMARY OF THE INVENTION

By the way, in the above mentioned configuration, the actuator for controlling the rocking, which is a heavy component, is arranged at a front side in the entire vehicle with respect to the cushion support arm. The left and right end portions of the cushion support arm are connected to the upper end parts of the left and right cushion units and the cushion support arm receives a road surface reaction via the left and right cushion units. The cushion support arm moves parallel in a horizontal state when the vehicle body is rocking in the left and right. A rocking mechanism capable of rocking the vehicle body in the left and right is arranged between the cushion support arm and the vehicle. In order to avoid the entire of rocking mechanism, the actuator is arranged at the front side even further, and therefore, the mass in the front section of the vehicle body is likely to be distributed.

An aspect of the present invention is to provide a structure of rocking controller of a saddle riding type vehicle that can suppress the mass distribution even an actuator for rocking control is installed.

A structure of rocking controller of a saddle riding type vehicle according to the present invention employs the following configuration.

(1) A structure of rocking controller of a saddle riding type vehicle according to an aspect of the present invention is a structure of rocking controller of a saddle riding type vehicle including a pair of left and right front wheels, a vehicle body that is laterally rockable in a state in which the pair of left and right front wheels are in contact with a ground, and an actuator configured to control the lateral rock of the vehicle body, the structure of rocking controller including: a rocking lock mechanism configured to lock lateral rocking of the vehicle body; wherein the rocking lock mechanism includes an arc shaped lock plate which crosses with an axial direction of a rocking shaft of the vehicle body and a lock caliper configured to lock a relative rocking between the lock plate and the lock caliper by clamping the lock plate, and a motor for the actuator is arranged in front of the rocking lock mechanism and the rotating drive shaft of the motor is arranged so as to penetrate an inner circumferential region of the arc shaped lock plate.

According to the configuration of above mentioned (1), it is possible to avoid arranging the actuator for rocking control, which is a heavy component, in the front section as much as possible, and therefore, it is possible to achieve a concentration of the mass and to suppress the actuator extending forward.

(2) In the aspect of above mentioned (1), the lock plate may be fixed to an arm member configured to move parallel when the vehicle body is laterally rocking in left and right, and the actuator may include the rotating drive shaft that is parallel with a rocking shaft between the vehicle body and the arm member and configured to apply a rotating drive force with respect to the arm member.

According to the configuration of above mentioned (2), since the direction in which the force from the rotating drive shaft of the actuator is along a relative rocking direction of the arm member and the vehicle body, it is possible to connect the actuator and the arm member with small number of components and to perform a rocking control by efficiently applying the rotating drive force of the actuator to the arm member.

(3) In the aspect of above mentioned (2), the rotating drive shaft and the rocking shaft may be arranged to have a different axial with each other, the actuator may include a rocking arm integrally rotate with the rotating drive shaft, and the rocking arm and the arm member may be connected via a link member.

According to the configuration of above mentioned (3), due to the presence of the link member, it is possible to easily absorb a deviation of the shaft center between the rotating drive shaft and the rocking shaft compared to a case the rotating drive shaft of the actuator is arranged at a same axial with the rocking shaft of the arm member.

(4) In the aspect of any one of above mentioned (1) to (3), the actuator may have a torque detecting sensor at a rear side thereof which is a side closer to the lock plate.

According to the configuration of above mentioned (4), since the actuator has a torque detecting sensor at a rear side thereof, it is possible to easily protect the torque detecting sensor from foreign objects and the like from the front side of the vehicle. If the torque detecting sensor is arranged inside of the lock plate, it is possible to easily protect the torque detecting sensor from foreign objects and the like from the surroundings.

According to the aspect of the present invention, it is possible to provide a structure of rocking controller of a saddle riding type vehicle that can suppress the mass distribution even an actuator for rocking control is installed.

DETAILED DESCRIPTION OF THE INVENTION

Figure 1:
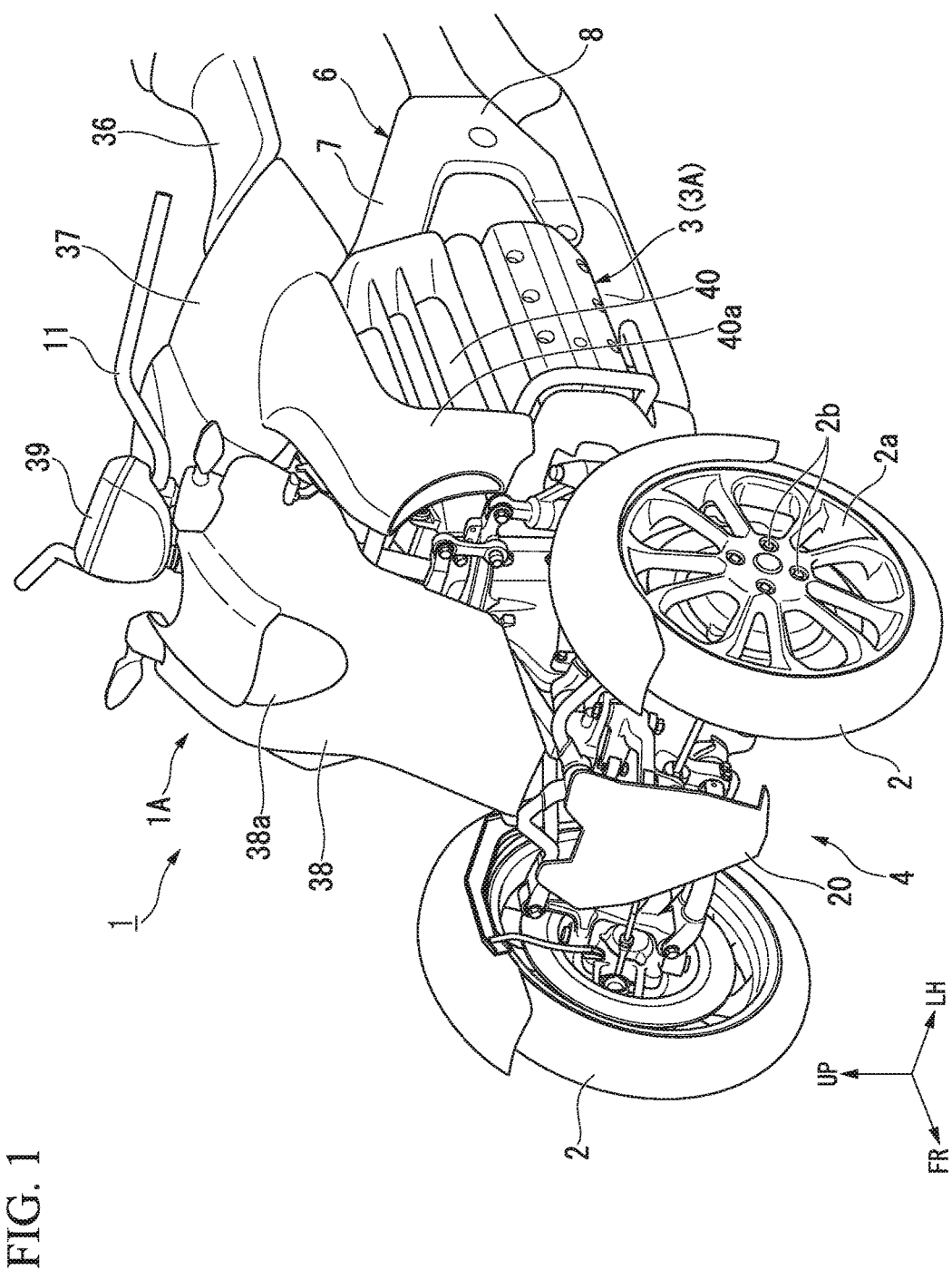
FIG. 1 is a perspective view seen from the front side of a vehicle body front section of a saddle riding vehicle according to an embodiment.

Hereinafter, an embodiment of the present invention will be described on the basis of the accompanying drawings. Further, directions of forward, rearward, leftward, rightward, and the like shown below are the same as directions in a vehicle described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

<Entire Vehicle>

FIG. 1 shows a vehicle body front section of a saddle riding vehicle 1 of the embodiment. The saddle riding vehicle 1 includes a pair of left and right front wheels (steered wheels) 2 installed on the vehicle body front section in lateral symmetry and a rear wheel (not shown) installed on a vehicle body rear section as a single driving wheel. The saddle riding vehicle 1 is configured as a two-front-wheeled type three-wheeled rocking vehicle that enables lateral rocking (rolling motion) of a vehicle body 1A in a state in which the left and right front wheels 2 are in contact with the ground. The saddle riding vehicle 1 of the embodiment includes a structure of rocking controller 100 having a rocking lock mechanism 32A which will be described below.

In the following description, a configuration when the vehicle is in a state in which the left and right front wheels 2 are in contact with the ground on a horizontal road surface R, a load corresponding to a vehicle weight is applied to a two-front-wheeled suspension system 4 (to be described below) in a state of 1 G, the vehicle body 1A stands upright at a lateral rocking angle of 0 degrees, and a steered angle of the left and right front wheels 2 is an advancing straight ahead steering state of 0° will be described unless the context indicates otherwise. In the description as given below, lateral symmetry with respect to a vehicle body lateral center is formed unless the context indicates otherwise.

Figure 2:
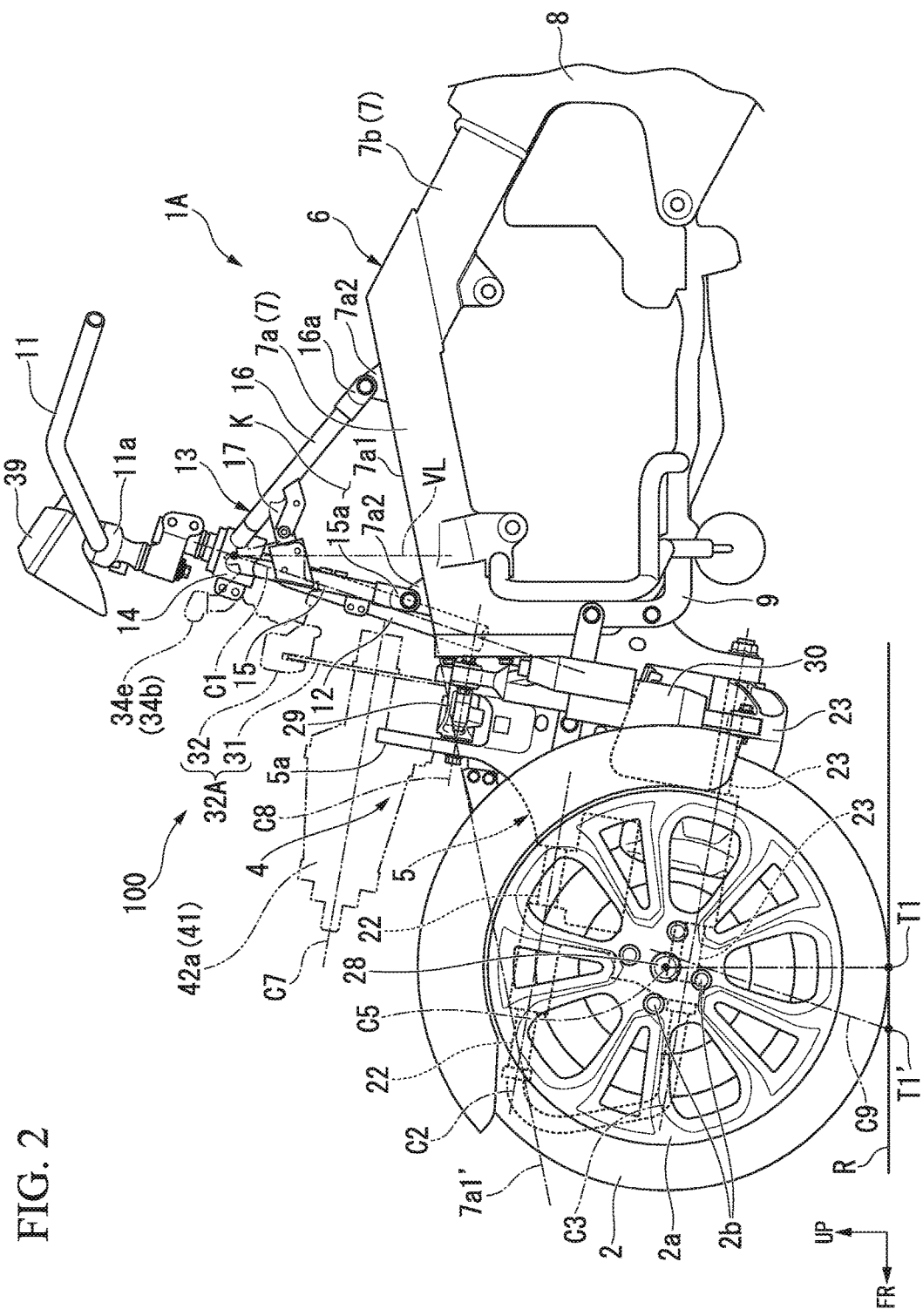
FIG. 2 is a left side view of the vehicle body front section of the saddle riding vehicle.
Figure 3:
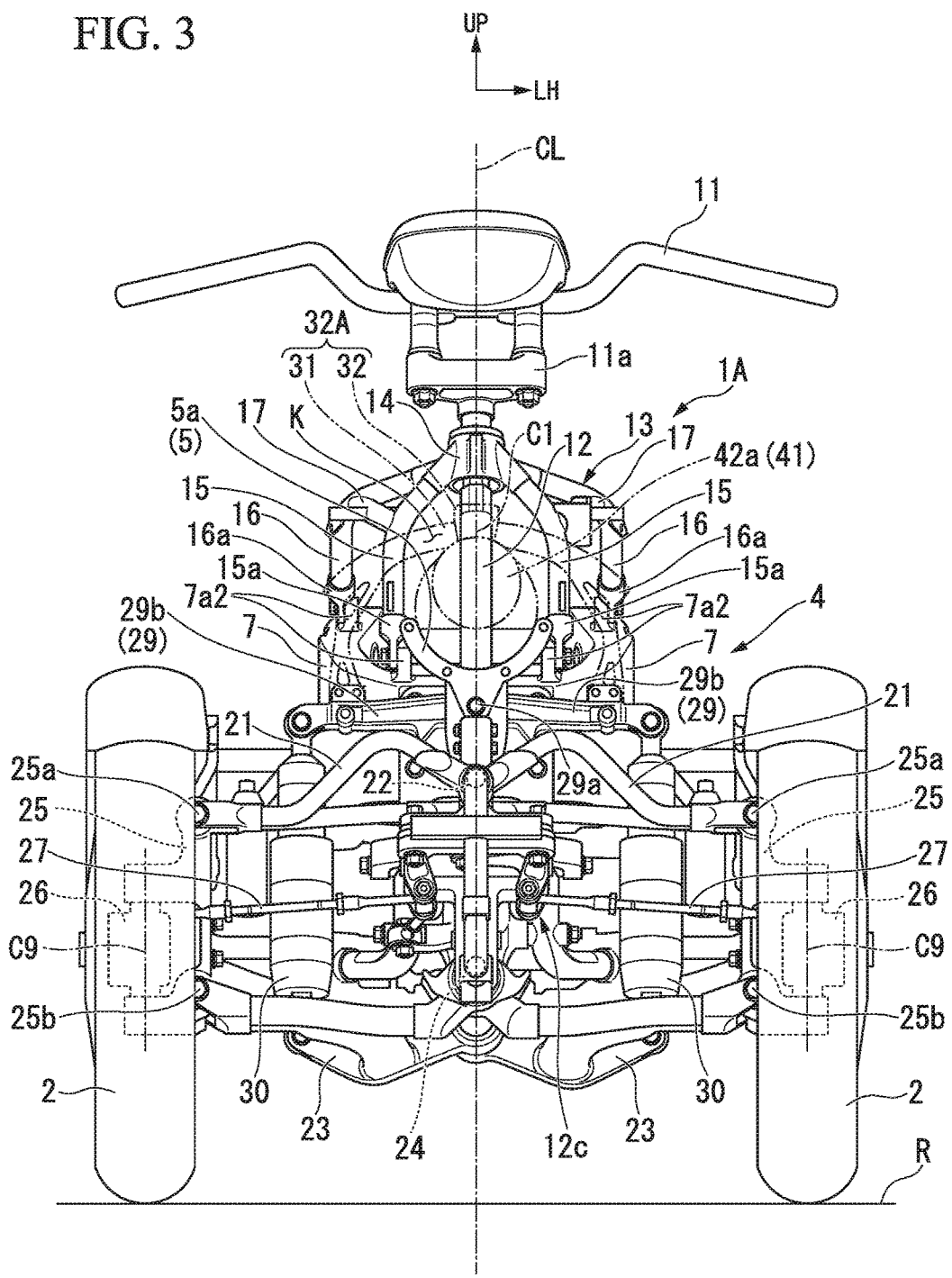
FIG. 3 is a front view of the vehicle body front section of the saddle riding vehicle.
Figure 4:
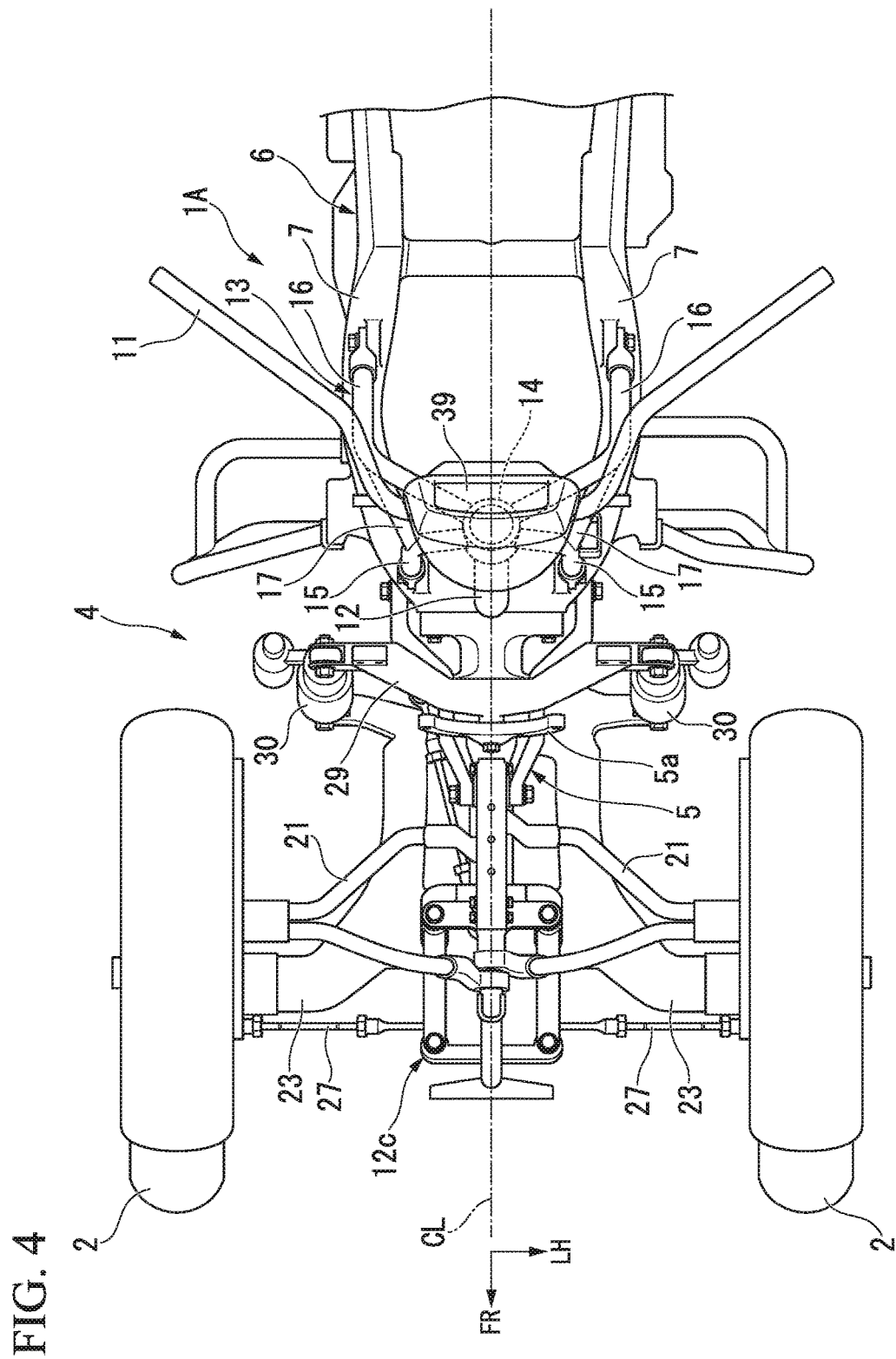
FIG. 4 is a plan view of the vehicle body front section of the saddle riding vehicle.

Referring to FIG. 2, in the saddle riding vehicle 1, a front suspension frame body 5 of the two-front-wheeled suspension system 4 is integrally coupled to a front section of a main frame body 6 disposed at a center of the vehicle body. A rear wheel suspension system (not shown) is connected to a rear section of the main frame body 6. The main frame body 6 is formed in a cradle shape that surrounds a power unit 3A of the saddle riding vehicle 1, and obtained by integrally coupling a plurality types of metal material through welding or the like. For example, the power unit 3A includes a horizontally opposed engine 3.

Figure 5:
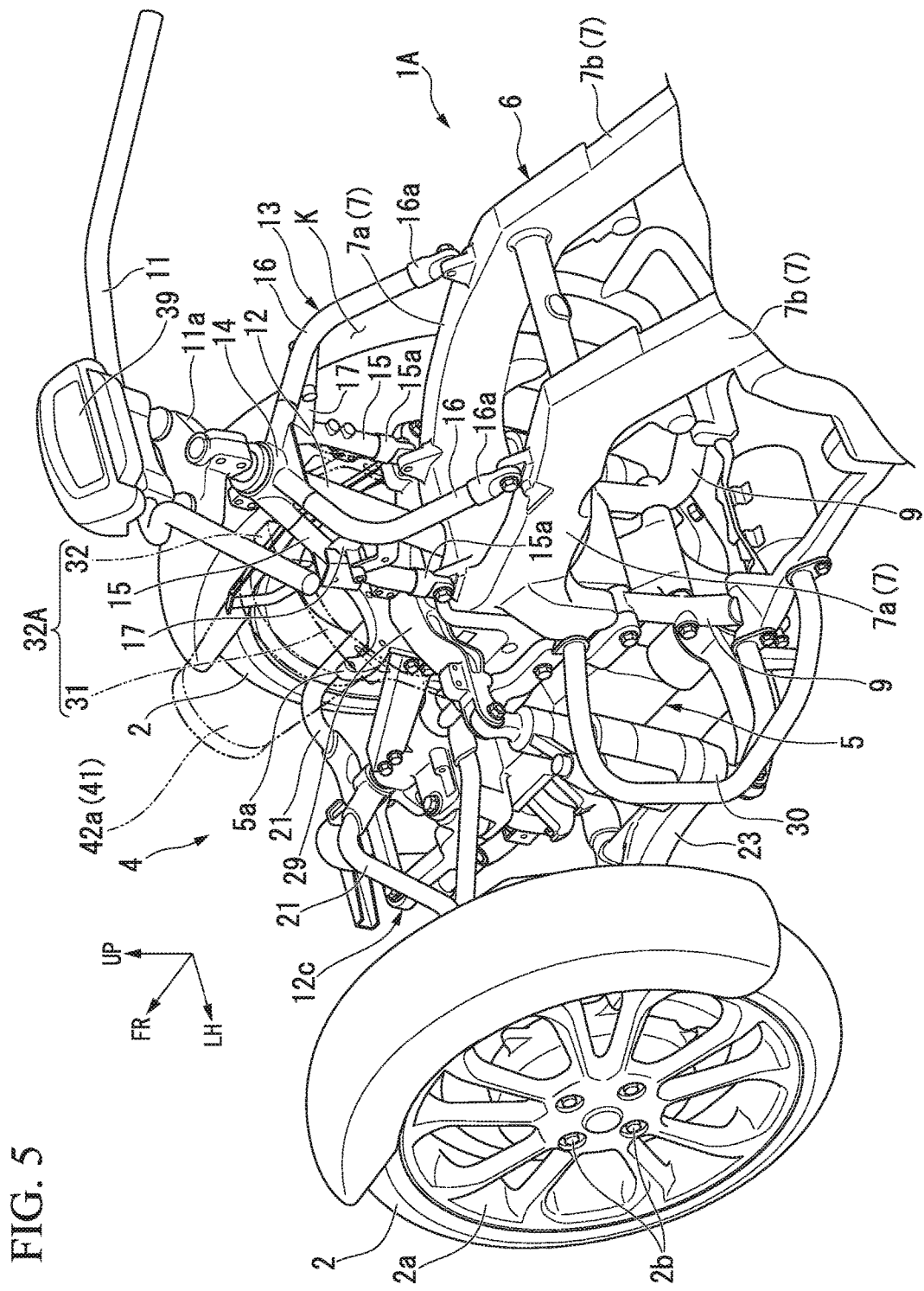
FIG. 5 is a perspective view seen from the back side of the vehicle body front section of the saddle riding vehicle.

Referring to FIG. 5, the main frame body 6 includes a pair of left and right main frames 7 extending in a forward/rearward direction of the vehicle and bent in an inverted V shape when seen in a side view, a pair of left and right pivot frames 8 extending downward to be connected to rear sections 7b of the left and right main frames 7, and a pair of left and right down frames 9 extending downward from front end portions of the left and right main frames 7 and then extending to be bent rearward and connected to front sides of lower sections of the left and right pivot frames 8. The main frame body 6 includes a cross frame configured to connect the left and right frame members at an appropriate place.

Figure 6:
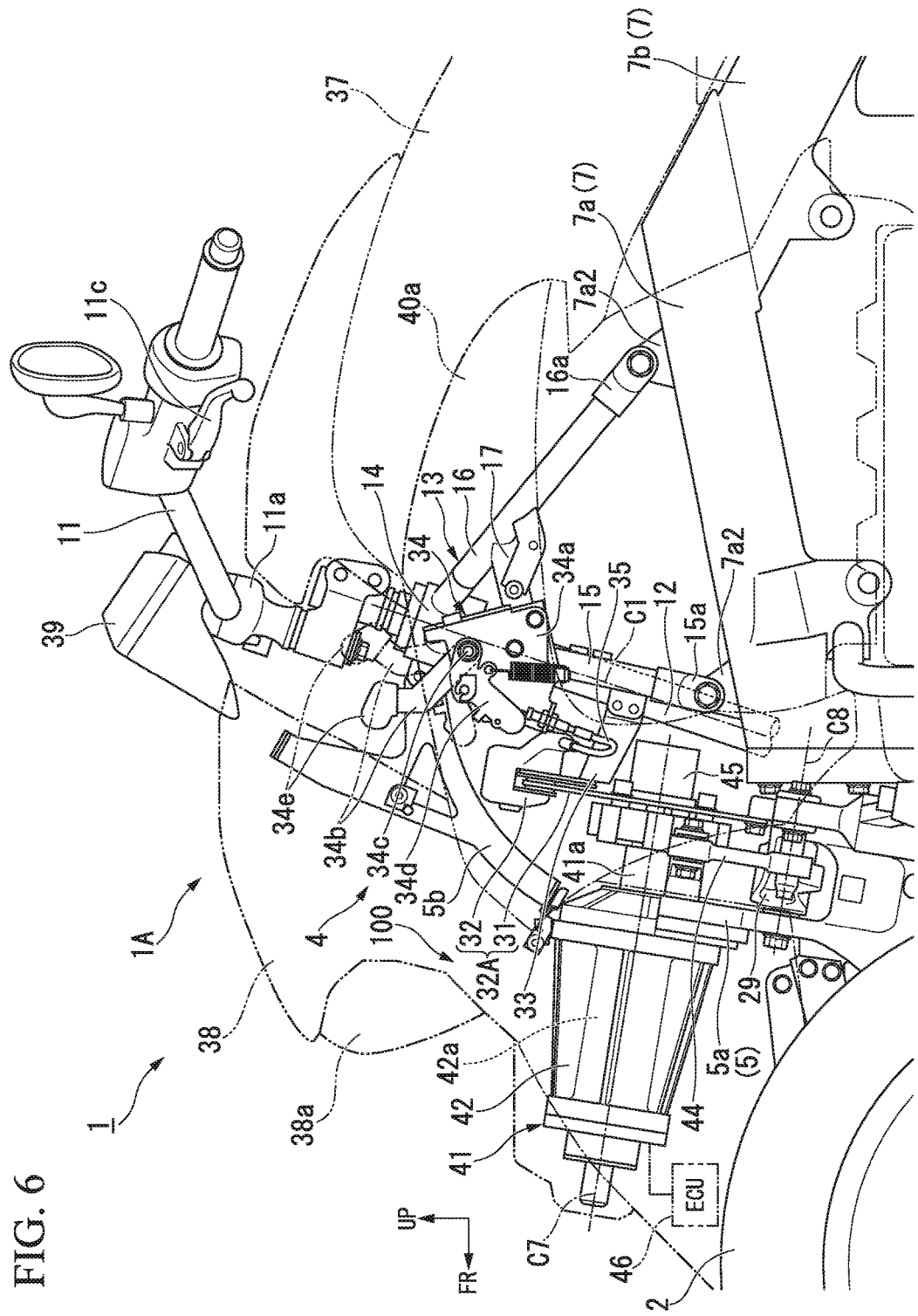
FIG. 6 is a left side view of surroundings of a steering post, a rocking lock mechanism and a lock operation lever of the saddle riding vehicle.

Referring to FIG. 1 and FIG. 6, a fuel tank 37 for the engine 3 is disposed above the left and right main frames 7. A seat 36 on which an occupant sits is disposed behind the fuel tank 37. A pair of left and right radiators 40 are disposed on left and right outer sides of front sections 7a of the left and right main frames 7. Surroundings of the left and right radiators 40 are covered by a pair of left and right radiator shrouds 40a. The left and right radiator shrouds 40a extends to a front side of the vehicle beyond the fuel tank 37 and front end positions of the left and right main frames 7.

Referring to FIG. 2 to FIG. 5, a steering post 13 configured to support an upper section of a steering shaft 12 is attached to a front upper section of the main frame body 6. A bar type steering handle 11 is attached to an upper end portion of the steering shaft 12 via a handle post 11a above the steering post 13. A lower section of the steering shaft 12 is pivotably supported by a rear section of the front suspension frame body 5. A line CL in the drawings designates a lateral center of the vehicle body 1A (a vehicle body lateral center).

A central axis (a steering axis) C1 of the steering shaft 12 is disposed on a vehicle body lateral center CL. The steering axis C1 is inclined such that an upper side in a vertical direction is disposed on a rear side when seen in a side view. The steering shaft 12 is disposed to overlap the front end portions of the main frames 7 when seen in a side view. While the steering shaft 12 integrally extends from the handle post 11a into the rear section of the front suspension frame body 5, the steering shaft 12 is not limited to an integrated member and may be configured to integrally pivot even if the steering shaft 12 is divided in the middle.

The steering post 13 is provided in a state in which a cylindrical shaft holder 14 through which the steering shaft 12 is inserted is supported by a pair of left and right front columns 15 and a pair of left and right rear columns 16. The shaft holder 14 is disposed in a direction in which the rear sections 7b inclined forward and upward in the left and right main frames 7 is extended when seen in a side view. The front sections 7a of the left and right main frames 7 are inclined forward and downward, and a height of the main frame body 6 is restricted.

Figure 7:
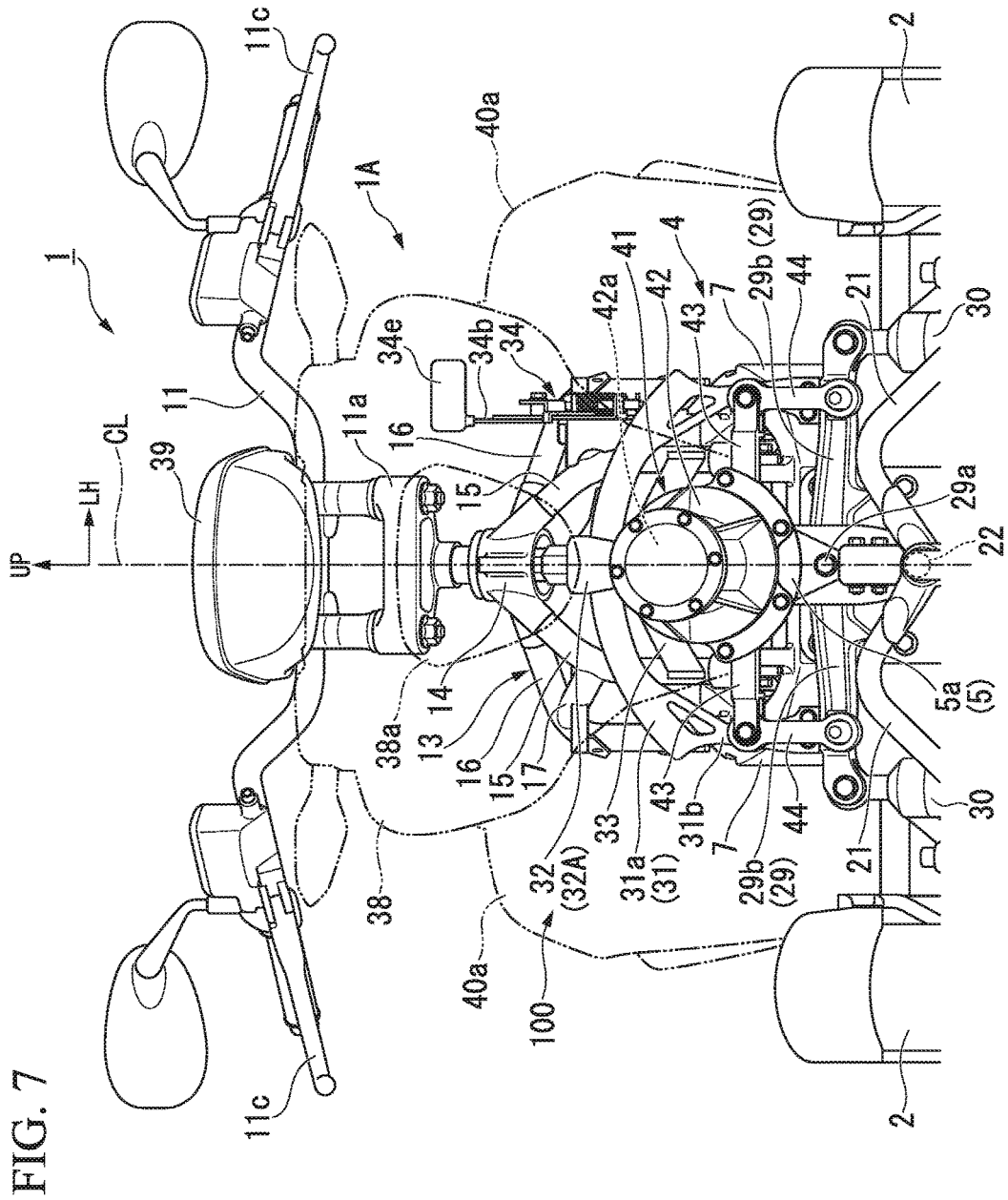
FIG. 7 is a front view of surroundings of the steering post, the rocking lock mechanism and the lock operation lever of the saddle riding vehicle.

Referring to FIG. 1, FIG. 6 and FIG. 7, an upper rear portion and side portions of the steering post 13 are covered by the front section of the fuel tank 37 and the left and right radiator shrouds 40a. A front side of the steering post 13 is covered by a front cover 38. A headlight 38a is disposed on the upper section of the front cover 38. A meter device 39 is supported by the handle post 11a on an upper rear side of the front cover 38. A brake lever 11b is disposed in front of a right grip of the steering handle 11, and a clutch lever 11c is disposed in front of a left grip of the steering handle 11. The brake lever 11b is at least one operator for front and rear wheel brakes, and the clutch lever 11c is an operator for a transmission clutch between the engine 3 and a gearbox (not shown) in the power unit 3A. A front lower cover 20 extending in the upward/downward direction is attached to the front end portion of the front suspension frame body 5.

Referring to FIG. 2 to FIG. 5, the two-front-wheeled suspension system 4 has an aspect of a double wishbone configured to independently suspend the left and right front wheels 2 on both sides of the front suspension frame body 5. Suspension components such as the front suspension frame body 5 of the two-front-wheeled suspension system 4, left and right upper arms 21, lower arms 23, cushion units 30, and so on, are disposed generally below extension lines 7a1' of upper surfaces 7a1 of the front sections 7a of the left and right main frames 7 when seen in a side view. Accordingly, a height of the suspension components of the two-front-wheeled suspension system 4 is restricted, and such disposition contributes to lowering of a center of gravity of the saddle riding vehicle 1.

Front end portions of the left and right main frames 7 are bent inward in the vehicle width direction and are integrally joined to each other. The front suspension frame body 5 is fastened and fixed to the front end portions of the left and right main frames 7 and the left and right down frames 9. A rear wheel suspension system (not shown) is connected to the rear section of the main frame body 6 including the left and right pivot frames 8.

<Front-Two-Wheeled Suspension System>

In the two-front-wheeled suspension system 4, in a state in which the left and right front wheels 2 are in contact with the ground, the vehicle body 1A including the main frame body 6, the power unit 3A, the front suspension frame body 5, and so on, can be laterally rocked, and the left and right front wheels 2 can be similarly laterally rocked according to the lateral rocking of the vehicle body 1A. On the other hand, the two-front-wheeled suspension system 4 enables the left and right front wheels 2 to alternately vertically move with respect to the vehicle body 1A.

Referring to FIG. 2 to FIG. 5, the front suspension frame body 5 extends in front of the main frame body 6 at a center in the vehicle width direction. Outer link members 25 are supported on left and right sides of the front suspension frame body 5 via the upper arms 21 and the lower arms 23. Left and right knuckle members 26 and the left and right front wheels 2 are steerably supported by the left and right outer link members 25.

The inner end portions disposed at centers of the left and right upper arms 21 in the vehicle width direction are vertically rockably supported by the upper section of the front suspension frame body 5 via an upper rocking shaft 22 extending generally in a forward/rearward direction. The inner end portions disposed at the centers of the left and right lower arms 23 in the vehicle width direction are vertically rockably supported by the lower section of the front suspension frame body 5 via a lower rocking shaft 24 parallel to the upper rocking shaft 22. Axes C2 and C3 of the upper and lower rocking shafts 22 and 24 are disposed in a posture raised at the front in which an inclination angle in a horizontal direction is reduced with respect to a direction perpendicular to an axis C1 of the steering shaft 12.

The upper end portions of the left and right outer link members 25 are rockably supported by the outer end portions of the left and right upper arms 21 via upper outer rocking shafts 25a parallel to the upper and lower rocking shafts 22 and 24. The lower end portions of the left and right outer link members 25 are rockably supported by the outer end portions of the left and right lower arms 23 via lower outer rocking shafts 25b parallel to the upper and lower rocking shafts 22 and 24.

When seen in the axial direction of the upper and lower rocking shafts 22 and 24, the left and right upper arms 21, the left and right lower arms 23 and the left and right outer link members 25 are disposed in a parallel link shape on left and right sides of the vehicle body. Accordingly, when the left and right upper arms 21 and the left and right lower arms 23 vertically rock, the left and right outer link members 25 vertically move substantially parallel to each other, and the left and right knuckle members 26 and the left and right front wheels 2 vertically move substantially parallel to each other together with the left and right outer link members 25. The upper and lower rocking shafts 22 and 24 are rocking shafts of the vehicle body 1A.

Here, a steering link mechanism 12c is connected to a lower end portion of the steering shaft 12. The left and right knuckle members 26 are connected to the steering link mechanism 12c via left and right tie rods 27. The left and right front wheels 2 are rotatably and axially supported by the left and right knuckle members 26. Pivotal movement of the steering handle 11 and steering of the left and right front wheels 2 are linked via the steering shaft 12, the steering link mechanism 12c, the left and right tie rods 27 and the left and right knuckle members 26.

Referring to FIG. 2 to FIG. 5, when seen in the axial direction of the upper and lower rocking shafts 22 and 24, the left and right tie rods 27 are installed to be substantially parallel to and have substantially the same length as those of the left and right upper arms 21 and the left and right lower arms 23. That is, when seen in the axial direction of the upper and lower rocking shafts 22 and 24, the left and right tie rods 27, the left and right upper arms 21 and the left and right lower arms 23 are disposed in a parallel link shape on left and right sides of the vehicle body. Accordingly, when the left and right upper arms 21 and the left and right lower arms 23 vertically lock, the left and right tie rods 27 vertically rock substantially parallel to the left and right upper arms 21 and the left and right lower arms 23, and an influence on a steering angle of the left and right front wheels 2 is minimized.

The left and right cushion units 30 configured to receive loads to the left and right front wheels 2 extend generally in the upward/downward direction at above the rear sections of the left and right lower arms 23. The left and right cushion units 30 are inclined such that upper sides thereof in the vertical direction are disposed on a rear side, and are disposed to extend to be perpendicular to the upper and lower rocking shafts 22 and 24 when seen in a side view. The left and right cushion units 30 are disposed to extend substantially vertically when seen in a front view.

The left and right cushion units 30 have lower end portions thereof connected to the left and right lower arms 23, and upper end portions thereof connected to left and right end portions of cushion support arms 29 (arm member), respectively. The left and right central portions of the cushion support arms 29 are rockably supported by the front suspension frame body 5 via rocking shafts 29a parallel to the upper and lower rocking shafts 22 and 24. An actuator 41 configured to control an inclination angle of the vehicle body 1A is connected to the cushion support arms 29 via link members 44 (see FIG. 6 and FIG. 7).

The cushion support arms 29 integrally have left and right arm sections 29b. The left and right arm sections 29b are disposed in a parallel link form on left and right sides of the vehicle body together with the left and right lower arms 23 and the left and right cushion units 30 when seen in the axial direction of the upper and lower rocking shafts 22 and 24. Accordingly, when the left and right arm sections 29b and the left and right lower arms 23 vertically rock, the left and right cushion units 30 vertically rock substantially parallel thereto.

The outer link members 25 extend generally in the upward/downward direction, and support knuckle members 26 on the outer sides of the lower sections thereof. The knuckle members 26 steerably support steering axles (king pin shafts) substantially parallel to the steering shaft 12 when seen in a side view. Hubs (not shown) of the front wheels 2 are rotatably supported by the knuckle members 26 via axles 28. Wheels 2a of the front wheels 2 are fastened and fixed to the hubs by a plurality of fastening sections 2b. Front wheel brakes (not shown) are provided inside the wheels 2a.

Central axes (king pin axes) C9 of the left and right steering axles are disposed on vertical lines offset equidistantly from the vehicle body lateral center CL to left and right sides when seen in a front view. The king pin axes C9 are disposed to be inclined such that upper sides are disposed on rear sides when seen in a side view. An intersection T1' of a downward extension portion of a king pin axis C9 with the road surface R when seen in the side view is disposed in front of a ground-contact point T1 vertically below an axle center C5 of the front wheels 2 to generate a trail. An inclination angle of the king pin axes C9 in the vertical direction is a caster angle when seen in a side view. The axles 28 of the front wheels 2 are offset toward front sides of the king pin axes C9 when seen in a side view.

<Rocking Lock Mechanism>

Referring to FIG. 6 and FIG. 7, a lock plate 31 having an arc-shaped section 31a about the rocking shafts 29a of the cushion support arms 29 is fixed to upper sections of the cushion support arms 29. The lock plate 31 is formed in a plate shape which crosses with the axial direction of the upper and lower rocking shafts 22 and 24. For example, the lock plate 31 is formed in a plate shape perpendicular to the axial direction of the upper and lower rocking shafts 22 and 24. The lock plate 31 has left and right leg sections 31b extending downward from both of left and right end portions of the arc-shaped section 31a curved to protrude upward. The lower end portions of the left and right leg sections 31b are fastened and fixed to the upper section of the left and right arm sections 29b of the cushion support arms 29, respectively.

A lock caliper 32 that can clamp the arc-shaped section 31a in a thickness direction is disposed on the upper end position of the arc-shaped section 31a. The lock caliper 32 is fastened to and supported by the steering post 13 via a caliper stay 33 in the leftward/rightward direction. The lock plate 31 and the lock caliper 32 constitute the rocking lock mechanism 32A configured to lock the lateral rocking of the vehicle body 1A.

When the vehicle body 1A is in an upright state in which the lateral rocking angle is 0 degrees, the lock caliper 32 is disposed on the upper end position of the arc-shaped section 31a. When the lock caliper 32 clamps the lock plate 31 in this state, the lateral rocking of the vehicle body 1A is locked in the upright state.

When the vehicle body 1A is laterally rocked, while the lock caliper 32 is laterally rocked together with the vehicle body 1A, the lock plate 31 moves parallel to the cushion support arms 29 in a horizontal posture. The lock caliper 32 relatively rocks with respect to the lock plate 31 along the arc-shaped section 31a. When the lock caliper 32 clamps the lock plate 31 in this state, the lateral rocking of the vehicle body 1A is locked at an arbitrary rocking angle. In this case, the vehicle body 1A can be raised in the upright state even on an inclined surface.

Referring to FIG. 1, FIG. 6 and FIG. 7, for example, the lock operation mechanism 34 configured to perform a lock operation and a lock release operation of the rocking lock mechanism 32A is disposed on the left side of the vehicle body front section. The lock operation mechanism 34 is disposed close to a rear upper side of the lock caliper 32 when seen in a side view. The lock operation mechanism 34 includes a base member 34a fixed to the steering post 13, and a lock operation lever 34b rockably supported by the base member 34a via a rocking shaft 34c in the vehicle width direction.

A cable locking member 34d is integrally rockably connected to the lock operation lever 34b. One end of an operation cable 35 is locked to the cable locking member 34d. The other end of the operation cable 35 is locked to an actuating arm (not shown) of the lock caliper 32. Although the lock caliper 32 is biased to a side on which the internal mechanism releases the clamp of the lock plate 31, when the operation cable 35 is pulled, the lock caliper 32 is operated to clamp the lock plate 31 against the biasing force.

The lock operation lever 34b shown by a solid line in FIG. 6 shows a state of an initial position at which a clamping operation of the lock caliper 32 is released without pulling the operation cable 35. The lock operation lever 34b shown by a dotted-dashed line in FIG. 6 shows a state of an operation position at which the lock caliper 32 is clamped by pulling the operation cable 35.

For example, the lock operation lever 34b pulls the operation cable 35 and clamps (locks) the lock caliper 32 when an operation of pivoting upward and rearward a gripping section 34e that is an operation input section (a lock operation) is performed from the state of the initial position. Here, the lateral rocking of the vehicle body 1A is locked (restrained). The lock operation lever 34b releases the clamping operation of the lock caliper 32 (a lock release action) with a termination of pulling the operation cable 35 when an operation of pivoting the gripping section 34e downward and forward (an operation of returning the gripping section 34e to the initial position, a lock release operation) is performed by a lock operation from the state of the operation position. Here, the lock of the lateral rocking of the vehicle body 1A is released.

Since both of the lock operation lever 34b and the lock caliper 32 are supported by the steering post 13 of the vehicle body 1A such that a relative position therebetween is not varied, a degree of routing freedom of the operation cable 35 is high. That is, in the embodiment, in comparison with the case in which the lock operation lever 34b is supported by the steering handle 11 or the like and the relative position is varied, there is no need to consider a surplus length of the operation cable 35 according to the variation of the relative position. Further, the lock operation lever 34b and the lock caliper 32 may be linked via a link mechanism, a cam mechanism, or the like, in addition to the operation cable 35.

The gripping section 34e of the lock operation lever 34b is disposed in front of the shaft holder 14 (in front of the axis C1 of the steering shaft 12) and disposed behind the headlight 38a at both of the initial position and operation position. At least a portion of the gripping section 34e is disposed above the shaft holder 14 in the upward/downward direction at both of the initial position and the pivot position. Since the gripping section 34e is disposed in front of the rear end of the shaft holder 14 even upon a maximum pivotal movement, interference of the gripping section 34e with another member or an occupant during driving is suppressed.

The gripping section 34e of the lock operation lever 34b is disposed between the front end portion of the fuel tank 37 and the rear end portion of the front cover 38. The lock operation mechanism 34 is covered by a radiator shroud 40a from the outside in the vehicle width direction except for surroundings of the gripping section 34e of the lock operation lever 34b. Since the gripping section 34e of the lock operation lever 34b is disposed in front of the fuel tank 37 gripped by an occupant's knees and disposed to be separated forward and downward from the steering handle 11 while being disposed at a position where the gripping section 34e is easily seen from the occupant and easily operated, an unintentional contact of the occupant with the lock operation lever 34b is suppressed.

<Actuator>

Referring to FIG. 6 and FIG. 7, the actuator 41 includes a bottomed cylindrical housing 42 parallel to the upper and lower rocking shafts 22 and 24, and a rotating drive shaft 41a coaxial with the housing 42. The actuator 41 is an electric motor or a fluidic device configured to generate a torque around a central axis C7 in the rotating drive shaft 41a. A motor 42a (a rotating electric machine) including a stator and a rotor is accommodated in the housing 42. Rocking arms 43 protruding toward both of left and right sides and configured to rock around the axis C7 are installed on the rear section of the actuator 41. The rocking arms 43 are connected to the rotating drive shaft 41a protruding toward a rear side of the housing 42 via a connecting apparatus 45. The rocking arms 43 are connected to the left and right arm sections 29b of the cushion support arms 29 via the link members 44 extending in the upward/downward direction. The rocking arms 43, the link members 44 and the cushion support arms 29 are disposed in a parallel link shape when seen in the axial direction of the upper and lower rocking shafts 22 and 24.

A lower side of the rear end portion of the housing 42 of the actuator 41 is fixed to an actuator support section 5a of the front suspension frame body 5. A cowl stay 5b configured to support the front cover 38 or the like is bridged between the rear upper end portion of the housing 42 of the actuator 41 and the front end portion of the shaft holder 14 of the steering post 13.

The connecting apparatus 45 configured to connect the rocking arms 43 and the rotating drive shaft 41a is installed on the rear end portion of the actuator 41. The connecting apparatus 45 is disposed to enter the inner circumferential region of the lock plate 31 of the rocking lock mechanism 32A together with the rotating drive shaft 41a protruding rearward from the housing 42.

The connecting apparatus 45 accommodates a load sensor configured to detect a load (a torque) transmitted between the rocking arms 43 and the rotating drive shaft 41a. That is, the connecting apparatus 45 functions as a torque detecting sensor configured to detect a transmission torque between the rocking arms 43 and the rotating drive shaft 41a. The rotating drive shaft 41a of the actuator 41 protrudes rearward from the vehicle body through the inner circumferential region of the lock plate 31 and is connected to the load sensor. The rotating drive shaft 41a of the actuator 41 is arranged so as to penetrate an inner circumferential region of the lock plate 31. At least a part of the actuator 41 overlaps with the lock plate 31 in the forward/rearward direction. A detected value of the load is input to an electronic control unit (ECU) 46 serving as a control unit configured to control an actuation of the actuator 41. The ECU 46 controls driving of the actuator 41 on the basis of a detection result of the connecting apparatus 45, a vehicle speed, an inclination of the vehicle, an operation amount of a rider, or the like.

A load around the central axis C7 generated between the rocking arms 43 and the rotating drive shaft 41a is generated according to an operation resistance (a torque) of the actuator 41 when the cushion support arms 29 are to rock with respect to the actuator 41 supported at the vehicle body 1A side. That is, a load around the central axis C7 is generated between the rocking arms 43 and the rotating drive shaft 41a upon lateral rocking of the vehicle body 1A according to the operation resistance of the actuator 41. The ECU 46 controls driving of the actuator 41 according to the detected value of the load. The ECU 46 controls the actuator 41 such that at least a load input from the rocking arms 43 to the rotating drive shaft 41a, i.e., a load input from the cushion support arms 29 to the actuator 41 among the load transmitted between the rocking arms 43 and the rotating drive shaft 41a is increased or decreased. A rocking center (the axis C7) of the rocking arms 43 of the actuator 41 and a rocking center (an axis C8) of the cushion support arms 29 are parallel to each other, and an interlocking mechanism of those is simplified.

The ECU 46 detects a moment in a falling direction and a raising direction applied to the vehicle body 1A according to, for example, a detected value of an inertial sensor or a vehicle speed sensor installed on the vehicle body 1A and controls the driving of the actuator 41 such that the moment is not excessively increased. Accordingly, lateral rocking of the vehicle body 1A with respect to the driving of the occupant is assisted or suppressed, and a light rolling motion and balancing easiness are compatible.

Further, for example, the ECU 46 controls driving of the actuator 41 such that a resistance against the rocking of the vehicle body 1A is increased when the saddle riding vehicle 1 is in a stop state or a low vehicle speed state, and controls driving of the actuator 41 such that a resistance with respect to the rocking of the vehicle body 1A is decreased when the saddle riding vehicle 1 is in a middle or high vehicle speed state.

<Steering Post>

Figure 8:
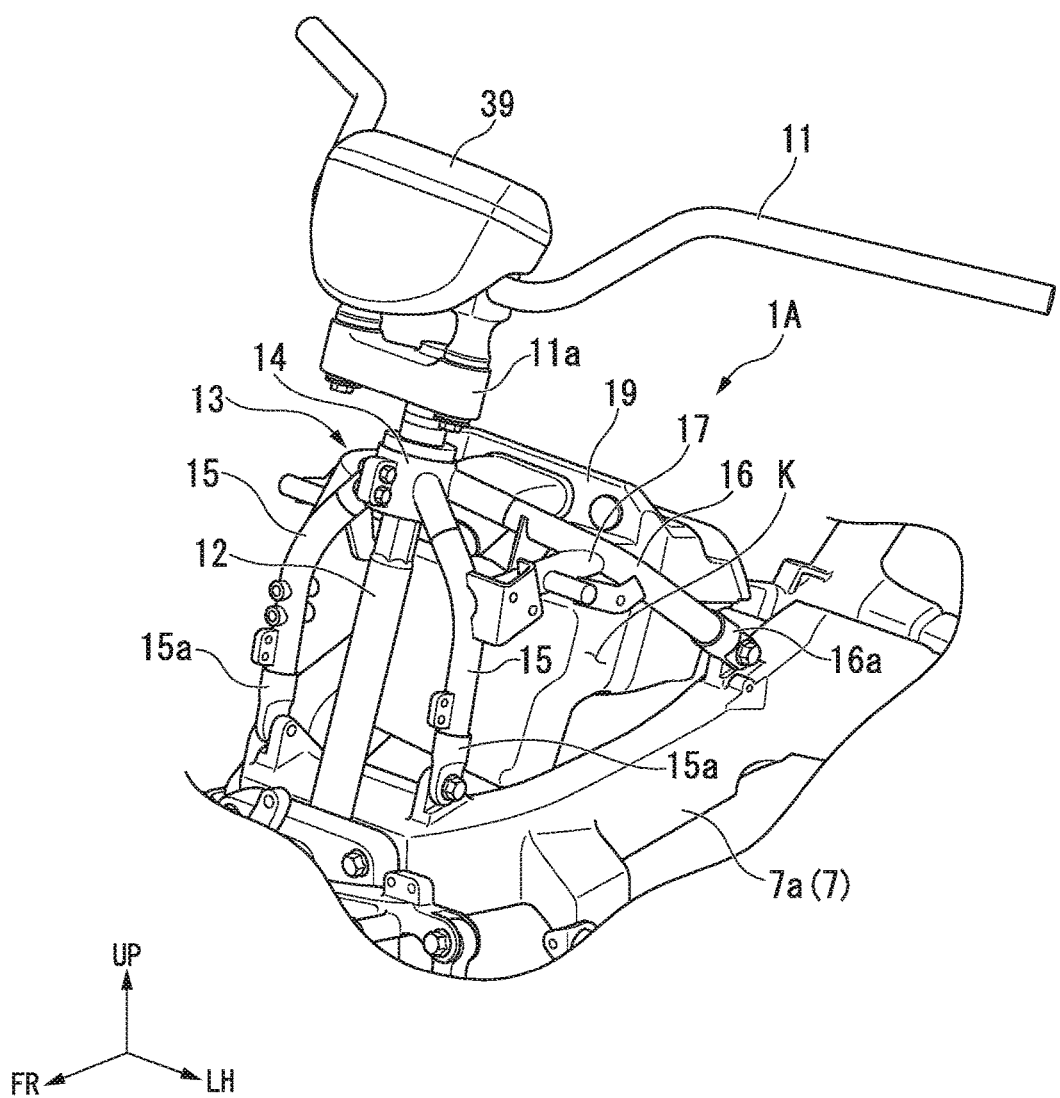
FIG. 8 is a perspective view of surroundings of the steering post of the saddle riding vehicle.

Referring to FIG. 2 and FIG. 8, the steering post 13 is formed separately from the main frame body 6 and attached to the upper surfaces 7a1 of the front sections 7a of the left and right main frames 7 of the main frame body 6. The steering post 13 is obtained integrally coupling a plurality of metal members through welding, fastening, or the like. The steering post 13 integrally has the plurality of columns 15 and 16 and the shaft holder 14 supported by the upper end portions of the plurality of columns 15 and 16. The columns 15 and 16 are formed in a pipe shape, protrude upward from the upper surfaces 7a1 of the front sections 7a of the left and right main frames 7, and are set to intersect each other at the outer circumference of the cylindrical shaft holder 14 to support the shaft holder 14. The steering post 13 can achieve reduction in weight by lowering strength and rigidity because a load from the two-front-wheeled suspension system 4 and rear wheel suspension system is not input. As the steering post 13 disposed above the main frame body 6 is reduced in weight, further lowering of a center of gravity can be achieved.

The columns 15 and 16 are constituted by the pair of left and right front columns 15 and the pair of left and right rear columns 16. A pair of left and right gusset pipes 17 is bridged between the upper sections of the left and right front and rear columns 15 and 16. A distance between the left and right front columns 15 is smaller than a distance between the left and right rear columns 16, and corresponds to that the front sections 7a of the left and right main frames 7 are formed to approach each other as they go forward. The front columns 15 are disposed with an inclination closer to a vertical direction than that of the steering shaft 12 (and the shaft holder 14) when seen in the side view. That is, when seen in the side view, an angle of the front columns 15 with respect to the vertical direction is smaller than angle of the steering shaft 12 (and the shaft holder 14) with respect to the vertical direction. The front columns 15 overlap the position in the forward/rearward direction with the axis C1 of the steering shaft 12 (that is an axis of the shaft holder 14). Accordingly, the steering shaft 12 does not enter a space K surrounded by the front and rear columns 15 and 16. Further, the front columns 15 may be disposed to be positioned behind the axis C1 of the steering shaft 12.

Lower end portions 15a and 16a of the front and rear columns 15 and 16 are fastened and fixed to fastening sections 7a2 protruding from the upper surfaces 7a1 of the front sections 7a of the left and right main frames 7 by fastening bolts inserted therethrough from the outside in the vehicle width direction. That is, the steering post 13 is detachably attached to the main frame body 6. At least fastened positions of the lower end portions 15a of the front columns 15 are disposed in front of the vertical line VL dropping from a center of the shaft holder 14 (a center of a width in the axial direction on the axis C1) when seen in the side view, and at least fastened positions of lower end portions 16a of the rear columns 16 are disposed behind the vertical line VL when seen in the side view. The lower end portions 15a of the front columns 15 are disposed at left and right outer sides further than the vehicle body lateral center CL, and the lower end portions 16a of the rear columns 16 are disposed at left and right outer sides further than the vehicle body lateral center CL. Accordingly, the plurality of columns 15 and 16 extend downward from the shaft holder 14 so as to be broaden towards the bottom, and the shaft holder 14 can be supported at front, rear, left and right sides with good balance.

An air cleaner box 19 for engine intake is disposed in the space K inside the steering post 13. Since the steering shaft 12 is not disposed in the space K inside the steering post 13, presence of the steering shaft 12 does not exert an influence on a capacity of the air cleaner box 19. Accordingly, the capacity of the air cleaner box 19 can be increased as possible while disposing the air cleaner box 19 inside the steering post 13. Since the steering post 13 is detachable, assemblability or maintenance of the air cleaner box 19 is secured.

Figure 9:
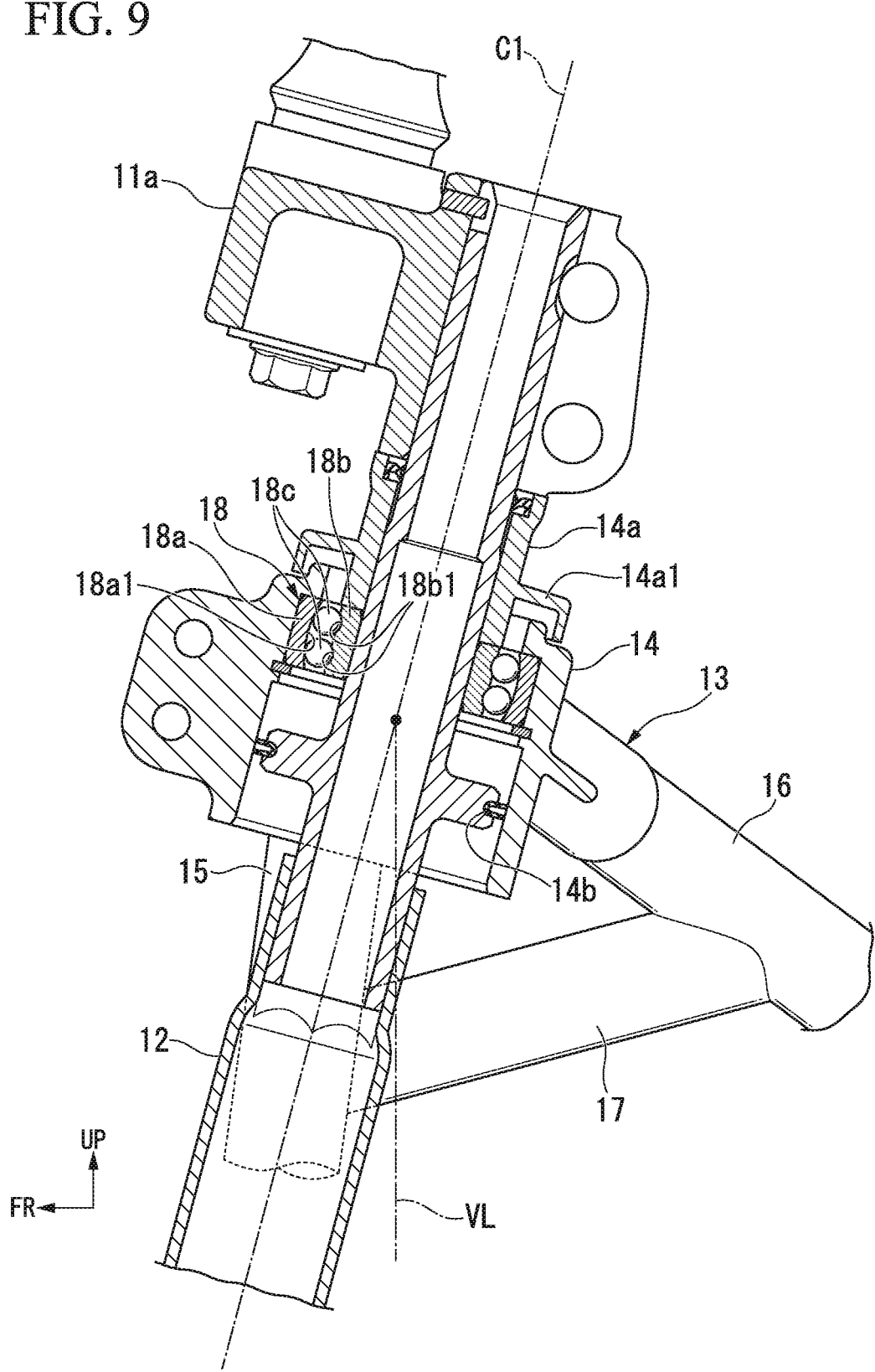
FIG. 9 is a cross-sectional view of a lateral center of the steering post of the saddle riding vehicle.

Referring to FIG. 9, the shaft holder 14 supports the steering shaft 12 via a bearing 18 that can be automatically centered. The bearing 18 is a ball bearing, a trajectory surface 18a1 of an outer ring 18a is a spherical surface, and a center of the spherical surface coincides with a center of the bearing 18. The center of the bearing 18 is a point which is at a center of the outer ring 18a within the width in the axial direction and which is on the axis C1. An inner ring 18b has two rows of trajectory grooves 18b1, and a plurality of bearing balls 18c are rolled along each of the trajectory grooves 18b1. The inner ring 18b, the bearing balls 18c and a cage (not shown) configured to hold the bearing balls 18c are pivotable while being inclined with respect to the outer ring 18a within a prescribed angle.

The outer ring 18a is fixed and held by the inner circumference of the shaft holder 14, and the inner ring 18b is fixed and held by the outer circumference of the steering shaft 12. Even when a deviation of a shaft center occurs between the shaft holder 14 and the steering shaft 12 in the configuration, the deviation of the shaft center of the outer and inner rings 18a and 18b is automatically adjusted. In particular, the deviation of the shaft center between the shaft holder 14 and the steering shaft 12 can be absorbed even using the steering post 13 configured to support the shaft holder 14 in the plurality of columns 15 and 16. In addition, it is also effective for the deviation of the shaft center due to the fact that the steering post 13 is detachable. A collar 14a is interposed between the inner ring 18b and the handle post 11a, and an umbrella part 14a1 configured to cover an upper end opening of the shaft holder 14 is formed on an outer circumference of the collar 14a. A dust seal section 14b configured to prevent intrusion of water or foreign substances from an opening of the lower section of the shaft holder 14 is installed on the lower section inner circumference of the shaft holder 14 below the bearing 18.

Referring to FIG. 6 and FIG. 7, the lock caliper 32 is attached to the front columns 15 via the caliper stay 33. The caliper stay 33 is constituted by a belt-shaped steel member extending in the leftward/rightward direction, and bent such that left and right side portions thereof are displaced rearward with respect to left and right central portions. The lock caliper 32 is fastened and fixed to the left and right central portions of the caliper stay 33, and the left and right end portions of the caliper stay 33 are fastened and fixed to the front columns 15. The lock caliper 32 is fastened to the left and right central portions of the caliper stay 33 by fastening bolts inserted therethrough from a front side thereof, and the left and right end portions of the caliper stay 33 are fastened to the front columns 15 by fastening bolts inserted therethrough from the outside in the vehicle width direction.

While an operation of fastening the lock caliper 32 from the front side of the vehicle is interfered with the actuator 41, an operation of fastening a small assembly of the lock caliper 32 and the caliper stay 33 to the front columns 15 from the outside in the vehicle width direction is easily performed because the caliper stay 33 and fastening sections a15b of the front columns 15 are exposed to the outside in the vehicle width direction. Accordingly, attachment workability of the lock caliper 32 can be improved.

As described above, the embodiment provides the structure of rocking controller of a saddle riding type vehicle 1 including the pair of left and right front wheels 2, the vehicle body 1A that is laterally rockable in a state in which the pair of left and right front wheels 2 are in contact with a ground, and an actuator 41 configured to control the lateral rock of the vehicle body 1A, the structure of rocking controller 100 includes: a rocking lock mechanism 32A configured to lock lateral rocking of the vehicle body 1A; wherein the rocking lock mechanism 32A includes an arc shaped lock plate 31 which crosses with an axial direction of a rocking shaft of the vehicle body 1A and a lock caliper 32 configured to lock a relative rocking between the lock plate 31 and the lock caliper 32 by clamping the lock plate 31, and a motor 42a for the actuator 41 is arranged in front of the rocking lock mechanism 32A and the rotating drive shaft 41a of the motor 42a is arranged so as to penetrate an inner circumferential region of the arc shaped lock plate 31 (at least a part of the actuator 41 overlaps with the lock plate 31 in the forward/rearward direction).

According to the configuration, it is possible to avoid arranging the actuator 41 for rocking control, which is a heavy component, in the front section as much as possible, and therefore, it is possible to achieve a concentration of the mass and to suppress the actuator 41 extending forward.

In the embodiment, the lock plate 31 is fixed to a cushion support arm 29 configured to move parallel when the vehicle body 1A is laterally rocking in left and right, and the actuator 41 includes the rotating drive shaft 41a that is parallel with a rocking shaft 29*a* between the vehicle body 1A and the cushion support arm 29 and configured to apply a rotating drive force with respect to the cushion support arm 29.

In this case, since the direction in which the force from the rotating drive shaft 41*a* of the actuator 41 is along a relative rocking direction of the cushion support arm 29 and the vehicle body 1A, it is possible to connect the actuator 41 and the cushion support arm 29 with small number of components and to perform a rocking control by efficiently applying the rotating drive force of the actuator 41 to the cushion support arm 29.

In the embodiment, the rotating drive shaft 41*a* and the rocking shaft 29*a* is arranged to have a different axial with each other, the actuator 41 includes a rocking arm 43 integrally rotate with the rotating drive shaft 41*a*, and the rocking arm 43 and the cushion support arm 29 is connected via a link member 44.

Accordingly, due to the present of the link member, it is possible to easily absorb a deviation of the shaft center between the rotating drive shaft 41*a* and the rocking shaft 29*a* compared to a case the rotating drive shaft 41*a* of the actuator 41 is arranged at a same axial with the rocking shaft 29*a* of the cushion support arm 29.

In the embodiment, the actuator 41 has a torque detecting sensor (connecting apparatus 45) at a rear side thereof which is a side closer to the lock plate 31.

In this way, since the actuator has a torque detecting sensor at a rear side thereof, it is possible to easily protect the torque detecting sensor from foreign objects and the like from the front side of the vehicle. If the torque detecting sensor is arranged inside of the lock plate, it is possible to easily protect the torque detecting sensor from foreign objects and the like from the surroundings.

Further, the present invention is not limited to the above-mentioned embodiment, and for example, the present invention may be applied to a four-wheeled vehicle including left and right front wheels and left and right rear wheels, in addition to the three-wheeled vehicle including the left and right front wheels and the single rear wheel.

While the power unit of the embodiment includes an engine as a drive source, the drive source may be an electric motor or may be a drive source including the electric motor.

The rotating drive shaft of the actuator and the rocking shaft of the cushion support arm may be arranged to have same axial.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A structure for controlling rocking of a saddle riding vehicle including a pair of left and right front wheels, a vehicle body that is laterally rockable in a state in which the pair of left and right front wheels are in contact with a ground, and an actuator configured to control the lateral rock of the vehicle body, the structure for controlling rocking comprising:
    a rocking lock mechanism configured to lock lateral rocking of the vehicle body;
    wherein the rocking lock mechanism includes an arc shaped lock plate which crosses with an axial direction of a rocking shaft of the vehicle body and a lock caliper configured to lock a relative rocking between the lock plate and the lock caliper by clamping the lock plate, and
    a motor for the actuator is arranged in front of the rocking lock mechanism and the rotating drive shaft of the motor is arranged so as to penetrate an inner circumferential region of the arc shaped lock plate.

2. The structure for controlling rocking of a saddle riding vehicle according to claim 1,
    wherein the lock plate is fixed to an arm member configured to move parallel when the vehicle body is laterally rocking in left and right, and
    the actuator includes the rotating drive shaft that is parallel with a rocking shaft between the vehicle body and the arm member and configured to apply a rotating drive force with respect to the arm member.

3. The structure for controlling rocking of a saddle riding vehicle according to claim 2,
    wherein the rotating drive shaft and the rocking shaft are arranged to have a different central axes from each other,
    the actuator includes a rocking arm integrally rotatable with the rotating drive shaft, and
    the rocking arm and the arm member are connected via a link member.

4. The structure for controlling rocking of a saddle riding vehicle according to claim 1,
    wherein the actuator has a torque detecting sensor at a rear side thereof which is a side closer to the lock plate.

* * * * *